US009833813B2

(12) United States Patent
Rosenkranz

(10) Patent No.: US 9,833,813 B2
(45) Date of Patent: Dec. 5, 2017

(54) ULTRASONIC MOTOR

(75) Inventor: Mathias Rosenkranz, Karlsruhe (DE)

(73) Assignee: PHYSIK INSTRUMENTE GMBH & CO. KG, Karlsruhe (DE)

( * ) Notice: Subject to any disclaimer, the term of this patent is extended or adjusted under 35 U.S.C. 154(b) by 793 days.

(21) Appl. No.: 14/343,275

(22) PCT Filed: Sep. 5, 2012

(86) PCT No.: PCT/DE2012/100264
§ 371 (c)(1),
(2), (4) Date: May 9, 2014

(87) PCT Pub. No.: WO2013/034146
PCT Pub. Date: Mar. 14, 2013

(65) Prior Publication Data
US 2014/0246955 A1    Sep. 4, 2014

(30) Foreign Application Priority Data
Sep. 6, 2011    (DE) .................. 10 2011 082 200

(51) Int. Cl.
*H02N 2/02*    (2006.01)
*B06B 1/06*    (2006.01)
*H02N 2/00*    (2006.01)

(52) U.S. Cl.
CPC ......... *B06B 1/0648* (2013.01); *H02N 2/0055* (2013.01); *H02N 2/026* (2013.01)

(58) Field of Classification Search
CPC ...... H02N 2/106; H02N 2/108; H03H 9/2452; H03H 9/2457; H03H 9/2463
(Continued)

(56) References Cited

U.S. PATENT DOCUMENTS 4,923,598 A  *  5/1990  Schal ............... A61M 1/16
                                                 210/137
8,368,287 B2 *  2/2013  Kudo ............... H02N 2/026
                                                 310/323.01
(Continued)

FOREIGN PATENT DOCUMENTS

DE    19648726 A1    5/1998
DE    19750187 C2    6/2000
(Continued)

OTHER PUBLICATIONS

Englished Translation of DE 19750187, Bosch.*

Primary Examiner — Bryan Gordon
(74) Attorney, Agent, or Firm — The Concept Law Group, P.A.; Scott D. Smiley; Yongae Jun

(57) ABSTRACT

The invention relates to an ultrasonic motor having a bracket, a plate-shaped ultrasonic actuator arranged in the bracket, said ultrasonic actuator having two opposing main surfaces and at least four side surfaces connecting the main surfaces to one another, and an element to be driven, wherein the ultrasonic actuator is pressed against the element to be driven, and the bracket comprises a first frame that supports the ultrasonic actuator and a second frame in which the first frame is supported and guided by bearing elements, and the bearing elements are pressed elastically against the first frame by the second frame. According to the invention, the first frame is pressed against the main surfaces of the ultrasonic actuator via the bearing elements, thus preventing or reducing movements of the ultrasonic actuator in a direction vertical to the main surfaces.

18 Claims, 3 Drawing Sheets

(58) Field of Classification Search
USPC .............................. 310/323.02, 323.14, 354
See application file for complete search history.

(56) References Cited

U.S. PATENT DOCUMENTS

| | | | | |
|---|---|---|---|---|
| 2006/0043824 A1* | 3/2006 | Sakano | ................ | G02B 7/102 310/323.09 |
| 2011/0031847 A1* | 2/2011 | Sakamoto | .............. | H02N 2/026 310/323.02 |
| 2011/0141584 A1* | 6/2011 | Henderson | ............ | G02B 7/022 359/811 |
| 2011/0241487 A1* | 10/2011 | Mukae | ................... | H02N 2/026 310/323.02 |

FOREIGN PATENT DOCUMENTS

| | | |
|---|---|---|
| DE | 102007018039 A1 | 3/2008 |
| DE | 102008058484 A1 | 9/2009 |
| EP | 2200101 A1 | 6/2010 |
| WO | 2010/088932 A1 | 8/2010 |
| WO | 2010/088937 A1 | 8/2010 |

* cited by examiner

ULTRASONIC MOTOR

FIELD OF THE INVENTION

The invention relates to an ultrasonic motor with an ultrasonic actuator arranged in a holding device and an element that is to be driven by the ultrasonic actuator.

BACKGROUND OF THE INVENTION

A piezoelectric drive element in which a ceramic piezoelectric oscillator is retained in an oscillator holding device and the oscillator holding device itself is mounted so as to be movable on guide rails inside a housing is known from DE 196 48 726 A1. The oscillator is pressed against an element that is to be driven via a spring, the construction of the device being such that the oscillator is able to move in the direction of the driven element, but movement in both directions perpendicular thereto is to be prevented as far as possible. In this context, the guide rails allow the oscillator and the oscillator holding device almost complete freedom of movement in the direction of the driven element (x-direction), but they are intended to prevent undesirable movement thereof in the direction of the housing (y-direction) and perpendicularly thereto (z-direction). Aligning or adjusting screws arranged on one side of the housing are intended to assist with the adjustment of the complex guidance structure.

The adjustment operation also requires a great deal of time and experience, since incorrect or inaccurate positioning of the adjusting screws can cause the housing to be bent out of shape, which in turn has a negative effect on the movability of the oscillator and oscillator holding device in the x-direction. If the housing is bent out of shape, the position of the guide rails too is shifted correspondingly, and smooth movement of the oscillator holding device inside the guide rails is rendered practically impossible. However, smooth movement of the oscillator holding device is essential for the proper functioning of the ultrasonic motor.

A further drawback associated with DE 196 48 726 A1 is that considerable effort is required at the manufacturing stage to effectively prevent movement of the oscillator holding device and thus also of the oscillator in the z-direction. Only with correspondingly tight dimensional tolerances in terms of the guide structure is it possible to ensure that movement in the z-direction is effectively prevented. On the other hand, given that the tolerances are so close, even the slightest deformations of the housing and the consequent changes in position of the guide rails will obstruct movement in the x-direction.

The preceding is intended to illustrate that the adjustment by means of the aligning or adjusting screws is of essential importance in the case of DE 196 48 726 A1, and is correspondingly time-consuming and expensive.

SUMMARY OF THE INVENTION

It is therefore the object of the present invention to provide an ultrasonic motor having a holding device for an ultrasonic actuator that overcomes the disadvantages previously mentioned and known from the prior art, wherein it is possible in particular to provide precise, reliable guidance for the holding device and therewith for the ultrasonic actuator as well, simply and inexpensively.

This is achieved with the features of the independent claim. Preferred embodiments are the subject matter of the dependent claims.

The basic idea of the invention is that in an ultrasonic motor with a plate-shaped ultrasonic actuator arranged in a holding device and clamped therein, said ultrasonic actuator having two opposing main surfaces and at least four side surfaces connecting the two main surfaces to each other and to an element that is to be driven by the ultrasonic actuator, wherein the ultrasonic actuator is pressed against the element to be driven, and the holding device comprises a first frame, which supports the ultrasonic actuator, and a second frame, in which the first frame is supported and guided by bearing elements, and the bearing elements are pressed elastically against the first frame by the second frame. In this arrangement, the first frame is pressed against the main surfaces of the ultrasonic actuator via the bearing elements in such manner that movements of the ultrasonic actuator in a direction perpendicular to the main surfaces are prevented or reduced. The main surfaces are the surfaces of the ultrasonic actuator that have the largest surface area.

One advantage of the bearing elements being pressed elastically against the first frame by the second frame, and consequently the first frame being pressed against the major surfaces of the ultrasonic actuator, is that it represents a very easily implemented way to prevent or at least reduce undesirable movements of the ultrasonic actuator in the direction in question, that is to say the direction opposite to the direction in which the elements are being pressed. For precise, reliable guidance, it is particularly beneficial if the bias created by pressing the bearing elements against the main surfaces is symmetrical. Pressing the bearing elements elastically also enables compensation to be made for any dimensional tolerances with regard to the first and/or second frame. Another advantage is that pressing the bearing elements against the main surfaces of the ultrasonic actuator enables the size of the bearing elements, which is considerably larger than the side surfaces, to be used for support and guidance, so that relatively liberal limits can be set regarding the number, disposition and geometry of the bearing elements. This also makes it easier to use the bearing elements to prevent undesirable movement of the first frame and the ultrasonic actuator perpendicularly to the pressing direction of the bearing elements. Thus, the invention provides a simple solution that enables the ultrasonic actuator to be guided precisely in the direction of the driven element and at the same time effectively prevents undesirable movements of the ultrasonic actuator in the two directions perpendicular thereto, such that expensive, time-consuming adjustment of the guide for the frame supporting the ultrasonic actuator is no longer necessary, as said precise guidance is already enabled as the first and second frames are joined by the bearing elements arranged and compressed therebetween when the ultrasonic motor is assembled.

It may be advantageous that the bearing elements have an elongated shape and are preferably shaped like pins. Elongated bearing elements may be used to create a sliding guide along or in the direction of the bearing elements in a particularly simple manner. Moreover, pin-shaped bearing elements for a sliding guide of such kind can be manufactured relatively simply, from plastic for example. However, it is also conceivable to use spherical bearing elements to create a roller guide.

It may also be advantageous that the bearing elements are accommodated in recesses in the first frame and in recesses in the second frame that correspond to the recesses in the first frame. This provides a simple bearing arrangement for the bearing elements themselves.

In this context, it may be advantageous that the recesses of the first frame have a substantially V-shaped cross-section. This facilitates precise alignment of the bearing elements. In addition, tolerances in the dimensions and diameters of the bearing elements seated therein can be compensated by V-shaped recesses.

It may also be advantageous that at least one of the recesses in the second frame has a substantially rectangular cross-section. In this way, as it is possible to compensate for possible positional tolerances with regard to the recesses in the first frame.

It may be useful that the first frame has single-point bearing points, on which the ultrasonic actuator is supported. It may be particularly useful that the single-point bearing points are spherical segments. A single-point support provides a defined, specific bearing for the ultrasonic actuator in the holding device. The provision of single-point bearing points on the first frame also allows greater Dimensional tolerances relative to the ultrasonic actuator and/or the first frame.

It can also be useful that the first frame comprises at least two parts, wherein it may be advantageous that the at least two parts of the first frame are of identical construction. If the first frame is constructed in two or multiple parts, it is particularly easy to place and seat the ultrasonic actuator therein during assembly, as the individual parts can be attached to the ultrasonic actuator from the outside and then assembled. If the parts of the first frame are of identical construction, they may be manufactured particularly inexpensively. Moreover, when the parts of the first frame are shaped identically, they can also be assembled more easily, since it they cannot be assembled incorrectly.

It may be advantageous that the at least two parts of the first frame are held together by a spring element, preferably a leaf spring. This allows the parts of the first frame to be joined in a particularly simple manner, which enables the ultrasonic actuator to be clamped and held in place at the same time.

It may also be advantageous that the second frame comprises at least two parts. This facilitates assembly of the ultrasonic motor, wherein the first frame is inserted in the second frame.

It may also be advantageous that the second frame comprises at least one spring section, via which the elastic pressure is transmitted from the bearing members to the first frame in the direction of the main surfaces. A spring section enables the pressure from the bearing elements to be transmitted particularly easily. In a preferred embodiment, at least part or areas of the spring section are shaped to match the peripheral geometry of the bearing elements to be contacted thereby, thus ensuring that the bearing and retention of the bearing elements is optimised.

In this context, it may be advantageous that the spring section is constructed integrally with the second frame. An integral construction of the spring section with the second frame offers advantages in terms of both production and assembly.

It may further be advantageous that the second frame has two spring sections, and the second frame has two parts, each having two recesses, and the first frame has two parts, each having two recesses, so that in the assembled state the recesses and the matching recesses combine to form four cavities, in which the bearing elements are inserted. Thus, a very simple, effective way is provided to create a guide for the frame supporting the ultrasonic actuator and the ultrasonic actuator itself.

It may be advantageous that at least one spring component is arranged between the first frame and the second frame, and acts on the first frame, pressing the first frame together with the ultrasonic actuator in the direction of the element that is to be driven by the ultrasonic actuator. This enables the ultrasonic actuator to be pressed reliably against the driven element and thus trouble-free operation of the ultrasonic motor.

Combinations of the previously listed advantageous refinements of the invention and/or combinations of individual parts of the previously listed advantageous refinements are also conceivable.

BRIEF DESCRIPTION OF THE DRAWINGS

In the drawing, which takes the form of diagrammatic illustrations, not necessarily to scale.

DETAILED DESCRIPTION

Figure 1:
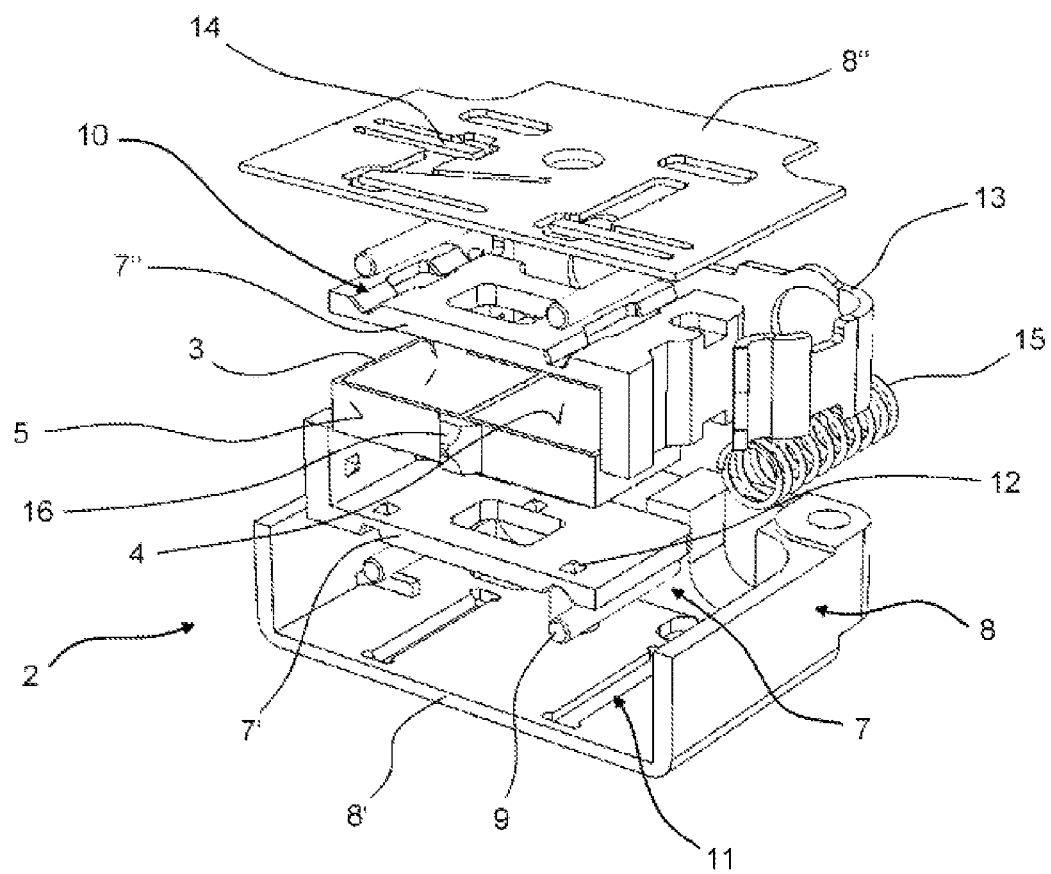
FIG. 1 is an exploded view of an embodiment of the holding device of the ultrasonic motor.

An exploded view of an embodiment of the holding device for the ultrasonic motor according to the invention is illustrated in FIG. 1. The driven element of the ultrasonic motor is not shown here. The bracket 2 comprises a first frame 7 and a second frame 8. The first frame 7 is made from plastic and comprises two identically shaped, unitary parts 7' and 7" with an L-shaped geometry, while the second frame 8 is made of machined aluminium, and comprises two, unitary parts 8' and 8" that are shaped differently from one another.

A piezoelectric ultrasonic actuator 3 having two main surfaces 4 and four side surfaces 5 is clamped inside the first frame 7, and is supported on pyramid-shaped bearing points 12, which are integral with the first frame 7. The pyramidal bearing points 12 are arranged in such manner that damping of the ultrasonic actuator 3 is minimised.

A friction element 16 made from wear-resistant ceramic material and arranged on a free side surface 5 is provided to ensure contact with the element that is to be driven. The friction element 16 is affixed to the ultrasonic actuator 3 by means of material closure, for example by adhesion.

The two parts 7' and 7" of the first frame are held together by a spring element 13, wherein the spring element 13 hooks behind the two parts 7' and 7" in each case engages in recesses or grooves provided thereon. At the same time, the spring element 13 ensures that bearing points 12 remain in contact with and are pressed against the ultrasonic actuator 3. In this way, movement of the ultrasonic actuator 3 inside the first frame 7 is not possible or is not intended.

Both parts 7' and part 7" of the first frame 7 have two recesses 10, which are V-shaped or trough-shaped. Pin-shaped bearing elements 9 made from tribologically optimised plastic are inserted in recesses 10 as sliding elements, although the sliding elements 9 are not fully inserted in the recesses 10, as a part of the elements 9 protrudes above a surface of the first frame 7. The protruding part of the sliding elements 9 is accommodated in recesses 11 of the second frame 8 that are provided as counterparts to the recesses 10. In this context, the part 8' has two recesses 11, one of which has a V-shaped cross-section and the other has a rectangular cross-section.

Part 8″, which is essentially a thin plate or sheet, also has two recesses 11, but these are continuous, so that corresponding openings are formed in part 8″, which openings are delimited by spring sections 14 that are formed integrally with part 8″. The spring sections 14 act on the sliding elements 9 that project through the openings formed by recesses 11 and press them into the recesses 10 in the first frame 7. In this context, it may be advantageous that spring sections 14 of part 8″ have a shape that conforms to or complements the circumferential geometry of the sliding elements 9, thus ensuring that the sliding elements 9 are encircled partially or in areas thereof by the spring sections 14.

The force exerted on the sliding elements 9 by the spring sections 14 through direct contact causes the sliding elements 9 arranged correspondingly oppositely to be clamped between recesses 10 of the first frame 7 and recesses 11 of the second frame 8.

Since the recess 11 of the part 8′ of the second frame 8 has a rectangular cross-sectional geometry, and the width thereof is greater than the diameter of the sliding elements 9, compensation can be made for positional tolerances with respect to recesses 10 in the first frame 7.

Two spring components 15 in the form of coil springs are arranged between the first frame 7 and the second frame 8, and are braced against the second frame 8 and act on the first frame 7 in such manner that they press the first frame 7, as well as, the ultrasonic actuator 3 which is arranged therein, in the direction of the driven element. The coil springs protrude through corresponding openings in the spring element 13.

The sliding elements 9 themselves cannot perform a relative movement in the longitudinal direction thereof. Only the guided movement of the first frame 7 along the sliding elements 9 is possible, whereas movements perpendicular thereto are effectively prevented or reduced, since the first frame 7 is braced against the sliding elements 9 in the corresponding directions. Thus, a movement of the first frame 7 and thus also of the ultrasonic actuator 3 clamped fixedly inside the first frame 7, is only possible in the direction of the free side surface 5, and thus in the direction of the element to be driven.

Since the first frame 7 slides along the sliding elements 9, which are arranged between the first frame 7 and the second frame 8, the method of construction or material from which the frame 8 is made is of no importance for the tribological properties and thus also the motor performance. For example, it is also conceivable for the second frame 8 to be injection moulded from plastic. Motor performance depends to a critical degree on whether a force with which the ultrasonic actuator is pressed against the driven element is constant. The contact pressure in turn depends on friction and sliding properties of the materials that are used in the first frame 7 and sliding elements 9. In order to achieve optimal friction and sliding properties, a suitable combination of materials is necessary. For the frictional and sliding properties and thus also the uniform, constant pressing of the ultrasonic actuator 3 against the element to be driven, only the combination of materials of the first frame 7 and sliding elements 9 is significant. In view of this, it is a simple matter to carry out a corresponding optimization of the second frame 8 in terms of the material from which it is made.

Figure 2:
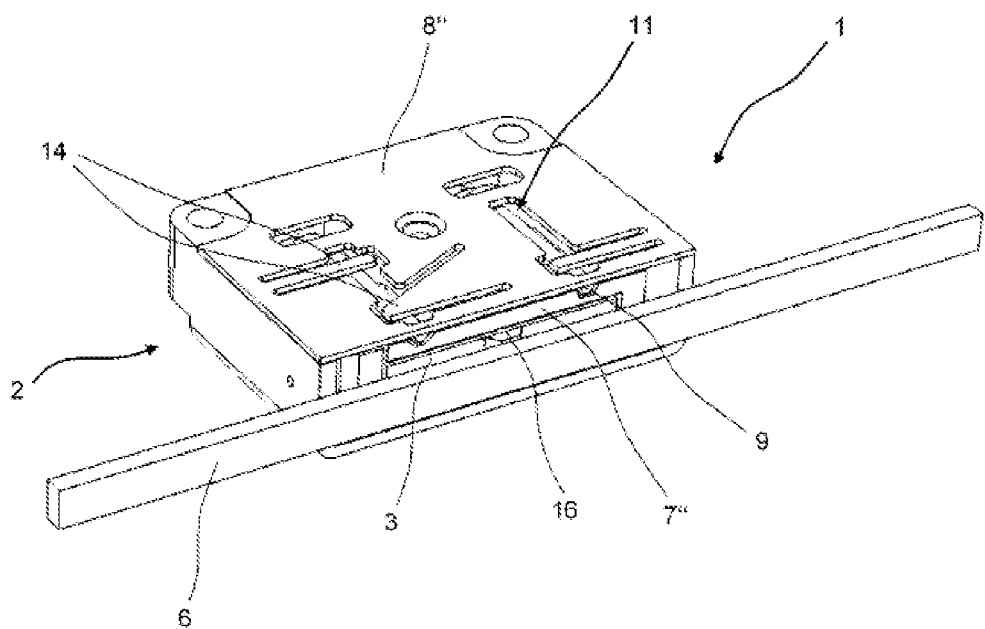
FIG. 2 is an illustration of an ultrasonic motor with a holding device according to FIG. 1.

An embodiment of the ultrasonic motor according to the invention with a holding device 2, as shown in FIG. 1, is illustrated in FIG. 2. The driven element 6 has a rectangular cross-sectional geometry and is made from a wear-resistant ceramic material. Other materials with high resistance to wear are also conceivable for this purpose. It is also possible for the driven element 6 to be constructed in multiple layers and to have a wear resistant surface coating that is intended for contact with the friction element 16 of the ultrasonic actuator 3.

Figure 3:
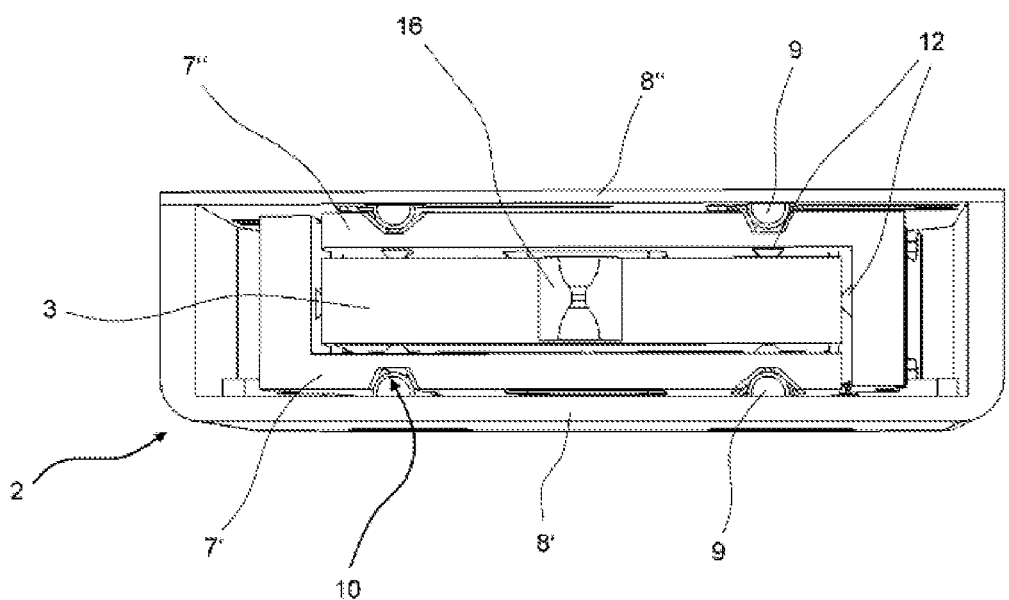
FIG. 3 is a plan view of the holding device of FIG. 1.

A plan view of the holding device of FIG. 1 is illustrated in FIG. 3. Here, the arrangement of the individual parts of the holding device 2 in an assembled state may be seen more clearly. The ultrasonic actuator 3 is firmly clamped between the two parts 7′ and 7″ of the first frame 7, which is supported on single-point bearing points 12. The first frame 7 and the second frame 8 are braced against one another because spring sections 14 of the part 8″ of the second frame 8 act on the sliding elements 9 that are in contact therewith. The perfectly symmetrical construction results correspondingly in symmetrical, defined tensioning conditions. Sliding elements 9 are fixed in their position by tensioning, and the elongated shape of the sliding elements 9 combine with the corresponding geometry of the recesses 10 and cutouts 11 to ensure that the desired alignment between the first frame 7 and the second frame 8 is achieved automatically when all parts of the holding device 2 are assembled, and is largely unaffected by tolerances of dimension, position or assembly. With the tension in the direction of the main surfaces of the ultrasonic actuator 3 through spring sections 14, it is also possible to compensate for normally present thickness tolerances of the ultrasonic actuator 3.

Figure 4:
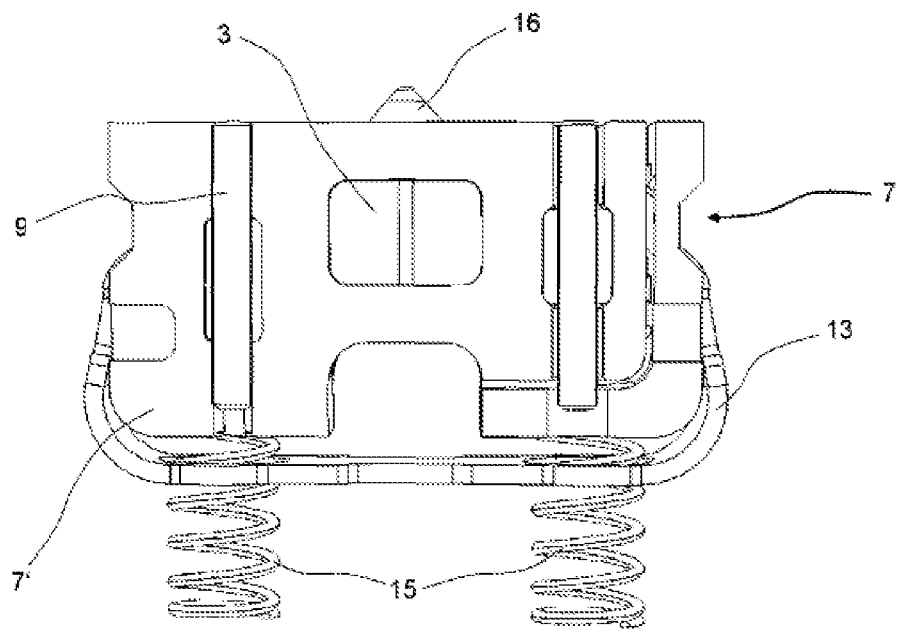
FIG. 4 is a detail view of the holding device of FIG. 1.

A portion of a holding device 2 of an ultrasonic motor according to the present invention, which shows the arrangement of the spring element 13 and spring components 15 particularly clearly, is illustrated in FIG. 4. The spring element 13 passes behind the first frame 7 and is substantially in the shape of a U, and two legs of the spring element 13 engage in corresponding grooves in the first frame 7. Two openings are provided in the spring element 13, though which spring components 15 protrude, wherein said components are in flush contact with the first frame 7. The spring components 15 are braced at the other end on the second frame 8, which is not shown in FIG. 4.

Figure 5:
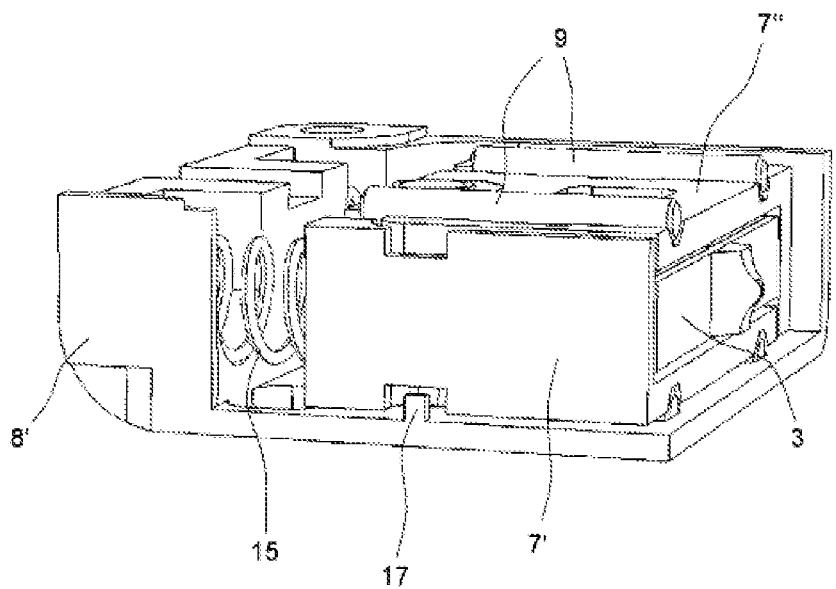
FIG. 5 is an illustration of a further detail of the holding device shown in FIG. 1.

A part of a holding device 2 of an ultrasonic motor according to the present invention is illustrated in FIG. 5. A part 8′ of a second frame 8 in this embodiment has a ridge portion 17, which engages in a corresponding recess or groove in a part 7′ of a first frame 7. Although not shown in FIG. 5, another ridge portion is also located in exactly the same manner on an opposite side, and is also in engagement with the part 7′ of the first frame 7. This effectively ensures that the first frame 7, and thus also an ultrasonic actuator 3 firmly clamped inside the first frame 7, cannot fall out of the second frame 8.

In the embodiments described above, sliding elements are used as bearing elements 9 to ensure sliding guidance, but any other kind of guide element known from the prior art would also be conceivable for use as a sliding or rolling guide.

The ultrasonic motor according to the invention is characterised in that it can be assembled very easily, and complex adjustment and settings with respect to the guidance of the ultrasonic actuator is not required. Said guide provides a simple solution for the compensation of dimensional, positional and installation tolerances, and at the same time enables highly stable, reliable motor performance.

The invention claimed is:
1. An ultrasonic motor comprising:
a holding device including:
a first frame, a second frame in which the first frame is supported, and bearing elements; and a plate-shaped ultrasonic actuator arranged in the holding device, said ultrasonic actuator having two opposing main surfaces and at least four side surfaces connecting the main surfaces to each other and said ultrasonic actuator configured to be pressed against an element to be driven, wherein:

the first frame supports the ultrasonic actuator and the first frame is guided by the bearing elements in the second frame such that a movement of the first frame is possible only in a direction of the element to be driven, and the bearing elements are pressed elastically against the first frame by the second frame, such that the first frame is pressed against the main surfaces of the ultrasonic actuator via the bearing elements for preventing movement of the ultrasonic actuator in a direction perpendicular to the main surfaces.

2. The ultrasonic motor according to claim 1, wherein the bearing elements have an elongated shape.

3. The ultrasonic motor according to claim 1, wherein the bearing elements are pin-shaped.

4. The ultrasonic motor according to claim 1, wherein the bearing elements are positioned in recesses of the first frame and cutouts in the second frame, the cutouts provided as counterparts to the recesses of the first frame.

5. The ultrasonic motor according to claim 4, wherein the recesses of the first frame have a substantially V-shaped cross-section.

6. The ultrasonic motor according to claim 4, wherein at least one of the cutouts of the second frame has a substantially rectangular cross-section.

7. The ultrasonic motor according to claim 1, wherein the first frame has at least one single-point bearing point on which the ultrasonic actuator is supported.

8. The ultrasonic motor according to claim 7, wherein the at least one single-point bearing point includes a spherical segment.

9. The ultrasonic motor according to claim 1, wherein the first frame has at least two unitary parts.

10. The ultrasonic motor according to claim 9, wherein the at least two parts of the first frame are of identical construction.

11. The ultrasonic motor according to claim 9, wherein the at least two parts of the first frame are held together by a spring element.

12. The ultrasonic motor according to claim 11, wherein the spring element is a leaf spring.

13. The ultrasonic motor according to claim 1, wherein the second frame has at least two unitary parts.

14. The ultrasonic motor according to claim 1, wherein the second frame has at least one spring section configured such that the bearing elements are elastically pressed against the first frame in a direction toward the main surfaces of the ultrasonic actuator.

15. The ultrasonic motor according to claim 14, wherein the at least one spring section is formed integrally with the second frame.

16. The ultrasonic motor according to claim 15, wherein:

the at least one spring section of the second frame has two spring sections;

the second frame has two parts, each of the two parts of the second frame including two cutouts; and the first frame has two parts, each of the two parts of the first frame including two recesses, such that when the ultrasonic motor is assembled four cavities are formed by the recesses and the corresponding cutouts and the bearing elements are inserted within the four cavities.

17. The ultrasonic motor according to claim 1, further comprising at least one spring component arranged between the first frame and the second frame, said spring component engaged in the first frame and adapted to assert a pressing force between the first frame and the ultrasonic actuator in a direction toward the element to be driven by the ultrasonic actuator.

18. An ultrasonic motor comprising:

a holding device including:

bearing elements, a first frame, and a second frame within which the first frame is translatably supported such that the first frame is moveable relative to the second frame by the bearing elements in a direction of an element to be driven; and a plate-shaped ultrasonic actuator arranged in the holding device, said ultrasonic actuator having two opposing main surfaces and at least four side surfaces connecting the main surfaces to each other and said ultrasonic actuator configured to be pressed against the element to be driven, wherein:

the first frame supports the ultrasonic actuator and the first frame is guided by the bearing elements in the direction of the element to be driven, and the bearing elements are pressed elastically against the first frame by the second frame, such that the first frame is pressed against the main surfaces of the ultrasonic actuator via the bearing elements for preventing movement of the ultrasonic actuator in a direction perpendicular to the main surfaces.

* * * * *